US008016658B2

(12) United States Patent
Wakker et al.

(10) Patent No.: US 8,016,658 B2

(45) Date of Patent: Sep. 13, 2011

(54) METHOD AND APPARATUS FOR ENHANCED PLAY OF A GAMING DEVICE

(75) Inventors: Jay S. Wakker, Ridgefield, CT (US); James A. Jorasch, New York, CT (US); Geoffrey M. Gelman, Brooklyn, NY (US); Stephen C. Tulley, Monroe, CT (US); Daniel E. Tedesco, Huntington, CT (US); Magdalena M. Fincham, Ridgefield, CT (US)

(73) Assignee: Walker Digital, LLC, Stamford, CT (US)

( * ) Notice: Subject to any disclaimer, the term of this patent is extended or adjusted under 35 U.S.C. 154(b) by 249 days.

(21) Appl. No.: 12/030,522

(22) Filed: Feb. 13, 2008

(65) Prior Publication Data

US 2008/0153565 A1 Jun. 26, 2008

Related U.S. Application Data

(63) Continuation of application No. 10/772,837, filed on Feb. 5, 2004, now abandoned.

(60) Provisional application No. 60/447,265, filed on Feb. 13, 2003, provisional application No. 60/445,473, filed on Feb. 5, 2003.

(51) Int. Cl.
*G06F 17/00* (2006.01)

(52) U.S. Cl. ........................................................ 463/16

(58) Field of Classification Search .............. 463/12–25, 463/29, 40–42; 273/26, 27, 143 R
See application file for complete search history.

(56) References Cited

U.S. PATENT DOCUMENTS 4,184,683 A 1/1980 Hooker
4,448,419 A 5/1984 Telnaes
4,570,934 A 2/1986 Smyth
4,669,731 A 6/1987 Clarke
4,679,143 A 7/1987 Hagiwara
4,695,053 A 9/1987 Vazquez, Jr.
4,760,245 A 7/1988 Fukaya
4,856,787 A 8/1989 Itkis (Continued)

FOREIGN PATENT DOCUMENTS

GB 2161008 A 1/1986

(Continued)

OTHER PUBLICATIONS

Notice of Allowability for U.S. Appl. No. 09/164,473 dated Aug. 28, 2000, 1pp.

(Continued)

*Primary Examiner* — Ronald Laneau

(74) *Attorney, Agent, or Firm* — Fincham Downs, LLC

(57) ABSTRACT

An electronic amusement device and a method for operating the device are disclosed. In accordance with one embodiment, a slot machine identifies a tracked symbol and initializes a running count representing active occurrences of the tracked symbol generated during a play session. During the session, the slot machine generates at least one outcome represented by a set of symbols and determines whether the outcome includes an occurrence of a tracked symbol. The slot machine adjusts the running count, increasing the running count to reflect occurrences of the tracked symbol and, in some embodiments, decreasing the running count to reflect expiration of occurrences of the tracked symbol. Once the running count reaches a predetermined level, the slot machine determines a bonus payout based on the running count.

6 Claims, 12 Drawing Sheets

U.S. PATENT DOCUMENTS

| | | | |
|---|---|---|---|
| 4,939,705 | A | 7/1990 | Hamilton |
| 4,991,848 | A | 2/1991 | Greenwood |
| 5,083,271 | A | 1/1992 | Thacher |
| 5,108,099 | A | 4/1992 | Smyth |
| 5,123,649 | A | 6/1992 | Tiberio |
| 5,178,390 | A | 1/1993 | Okada |
| 5,179,517 | A | 1/1993 | Sarbin |
| 5,242,163 | A | 9/1993 | Fulton |
| 5,259,616 | A | 11/1993 | Bergmann |
| 5,275,400 | A | 1/1994 | Weingardt |
| 5,277,424 | A | 1/1994 | Wilms |
| 5,342,047 | A | 8/1994 | Heidel |
| 5,356,140 | A | 10/1994 | Dabrowski |
| 5,370,399 | A | 12/1994 | Liverance |
| 5,393,057 | A | 2/1995 | Marnell, II |
| 5,393,061 | A | 2/1995 | Manship |
| 5,401,023 | A | 3/1995 | Wood |
| 5,409,225 | A | 4/1995 | Kelly |
| 5,449,173 | A | 9/1995 | Thomas |
| 5,494,287 | A | 2/1996 | Manz |
| 5,511,784 | A | 4/1996 | Furry |
| 5,544,892 | A | 8/1996 | Breeding |
| 5,559,312 | A | 9/1996 | Lucero |
| 5,564,700 | A | 10/1996 | Celona |
| 5,580,308 | A | 12/1996 | Nakamura |
| 5,580,309 | A | 12/1996 | Piechowiak |
| 5,586,766 | A | 12/1996 | Forte |
| 5,603,502 | A | 2/1997 | Nakagawa |
| 5,611,730 | A | 3/1997 | Weiss |
| 5,639,088 | A | 6/1997 | Schneider |
| 5,655,961 | A | 8/1997 | Acres |
| 5,664,998 | A | 9/1997 | Seelig |
| 5,695,400 | A | 12/1997 | Fennell |
| 5,695,402 | A | 12/1997 | Stupak |
| 5,697,843 | A | 12/1997 | Manship |
| 5,702,304 | A | 12/1997 | Acres |
| 5,704,835 | A | 1/1998 | Dietz |
| 5,720,662 | A | 2/1998 | Holmes, Jr. |
| 5,722,891 | A | 3/1998 | Inoue |
| 5,741,183 | A | 4/1998 | Acres |
| 5,755,621 | A | 5/1998 | Marks |
| 5,761,647 | A | 6/1998 | Boushy |
| 5,770,533 | A | 6/1998 | Franchi |
| 5,800,264 | A | 9/1998 | Pascal |
| 5,811,772 | A | 9/1998 | Lucero |
| 5,823,879 | A | 10/1998 | Goldberg |
| 5,833,537 | A | 11/1998 | Barrie |
| 5,833,538 | A | 11/1998 | Weiss |
| 5,833,540 | A | 11/1998 | Miodunski |
| 5,836,586 | A | 11/1998 | Marks |
| 5,848,932 | A | 12/1998 | Adams |
| 5,851,147 | A | 12/1998 | Stupak |
| 5,882,260 | A | 3/1999 | Marks |
| 5,910,048 | A | 6/1999 | Feinberg |
| 5,979,702 | A | 11/1999 | Hennessey |
| 5,980,384 | A | 11/1999 | Barrie |
| 5,997,400 | A | 12/1999 | Seelig |
| 5,997,401 | A | 12/1999 | Crawford |
| 6,004,207 | A | 12/1999 | Wilson |
| 6,015,344 | A | 1/2000 | Kelly |
| 6,019,374 | A | 2/2000 | Breeding |
| 6,033,307 | A | 3/2000 | Vancura |
| 6,039,648 | A | 3/2000 | Guinn |
| 6,053,813 | A | 4/2000 | Mathis |
| 6,068,552 | A | 5/2000 | Walker |
| 6,077,162 | A | 6/2000 | Weiss |
| 6,077,163 | A | 6/2000 | Walker |
| 6,089,975 | A | 7/2000 | Dunn |
| 6,093,100 | A | 7/2000 | Singer |
| 6,110,043 | A | 8/2000 | Olsen |
| 6,113,102 | A | 9/2000 | Marks |
| 6,135,882 | A | 10/2000 | Kadlic |
| 6,142,872 | A | 11/2000 | Walker |
| 6,165,071 | A | 12/2000 | Weiss |
| 6,203,430 | B1 | 3/2001 | Walker |
| 6,264,560 | B1 | 7/2001 | Goldberg |
| 6,270,409 | B1 | 8/2001 | Shuster |
| 6,270,412 | B1 | 8/2001 | Crawford |
| 6,287,202 | B1 | 9/2001 | Pascal |
| 6,302,790 | B1 | 10/2001 | Brossard |
| 6,312,332 | B1 | 11/2001 | Walker |
| 6,364,765 | B1 | 4/2002 | Walker |
| 6,375,187 | B1 | 4/2002 | Baerlocher |
| 6,471,589 | B1 | 10/2002 | Nagano |
| 6,520,856 | B1 | 2/2003 | Walker |
| 6,606,602 | B1 | 8/2003 | Kolls |
| 7,582,012 | B2 * | 9/2009 | Walker et al. .................. 463/17 |
| 2002/0042294 | A1 | 4/2002 | Pau |
| 2004/0072613 | A1 | 4/2004 | Visocnik |
| 2004/0162134 | A1 | 8/2004 | Walker |
| 2004/0214629 | A1 * | 10/2004 | Walker et al. .................. 463/20 |
| 2005/0119052 | A1 | 6/2005 | Russell |
| 2006/0223612 | A1 * | 10/2006 | Walker et al. .................. 463/16 |
| 2006/0247008 | A1 * | 11/2006 | Walker et al. .................. 463/20 |

FOREIGN PATENT DOCUMENTS

| | | |
|---|---|---|
| WO | WO 96/08295 | 3/1996 |
| WO | WO 98/19280 | 5/1998 |
| WO | WO 2005/079242 A2 | 9/2005 |

OTHER PUBLICATIONS

Office Action for U.S. Appl. No. 09/164,473 dated Jan. 18, 2001, 3pp.
Notice of Allowance for U.S. Appl. No. 09/052,291 dated Dec. 9, 1999, 4pp.
Notice of Allowance for U.S. Appl. No. 10/784,845 dated Dec. 11, 2007, 2pp.
Office Action re Petition Decision for U.S. Appl. No. 10/784,845 dated Mar. 2, 2007, 7pp.
Office Action for U.S. Appl. No. 10/784,845 dated Jul. 14, 2006, 4pp.
Office Action for U.S. Appl. No. 10/784,845 dated Apr. 27, 2006,10pp.
Office Action re Petition Decision for U.S. Appl. No. 10/784,845 dated Dec. 10, 2007, 5pp.
Office Action for U.S. Appl. No. 10/784,845 dated Apr. 7, 2005, 8pp.
Restriction for U.S. Appl. No. 10/784,845 dated Dec. 17, 2004, 4pp.
Office Action for U.S. Appl. No. 11/556,399 dated Mar. 13, 2007, 2pp.
Office Action for U.S. Appl. No. 11/556,399 dated Jun. 27, 2007, 2pp.
Office Action for U.S. Appl. No. 10/772,837 dated Sep. 13, 2007, 7pp.
Office Action for U.S. Appl. No. 10/778,576 dated Mar. 6, 2007, 2pp.
Office Action for U.S. Appl. No. 10/778,576 dated Jul. 20, 2005, 8pp.
Office Action for U.S. Appl. No. 11/456,255 dated Nov. 23, 2007, 5pp.
Office Action for U.S. Appl. No. 09/716,918 dated Jan. 8, 2008, 8pp.
Office Action for U.S. Appl. No. 09/716,918 dated May 8, 2007, 2pp.
Office Action for U.S. Appl. No. 09/716,918 dated Dec. 8, 2006, 11pp.
Office Action for U.S. Appl. No. 09/716,918 dated Jul. 20, 2005, 10pp.
Office Action for U.S. Appl. No. 09/716,918 dated Oct. 1, 2004, 7pp.
Office Action for U.S. Appl. No. 09/716,918 dated Oct. 1, 2004, 9pp.
Office Action for U.S. Appl. No. 09/716,918 dated Feb. 24, 2004, 6pp.
Office Action for U.S. Appl. No. 09/716,918 dated May 20, 2003, 4pp.
Office Action for U.S. Appl. No. 09/716,918 dated May 3, 2002, 4pp.
Decision on Petition for U.S. Appl. No. 09/716,918 dated Apr. 29, 2003, 1pp.
Notice of Non-Compliant Appeal Brief for U.S. Appl. No. 09/716,918 dated Oct. 3, 2007, 2pp.
Notice of Allowance for U.S. Appl. No. 10/752,068 dated Sep. 22, 2004, 5pp.
Office Action for U.S. Appl. No. 10/361,201 dated Jan. 28, 2008, 6pp.
Office Action for U.S. Appl. No. 10/361,201 dated Jun. 22, 2007, 7pp.
Office Action for U.S. Appl. No. 10/361,201 dated Dec. 12, 2006, 8pp.
Office Action for U.S. Appl. No. 09/108,646 dated Sep. 13, 2001, 2pp.
Notice of Allowability for U.S. Appl. No. 09/108,646 dated Nov. 28, 2001, 5pp.
Office Action for U.S. Appl. No. 09/108,646 dated Jun. 18, 2001, 6pp.

Office Action for U.S. Appl. No. 09/108,646 dated Dec. 29, 2000, 5pp.
Office Action for U.S. Appl. No. 09/108,646 dated May 10, 2000, 5pp.
Office Action for U.S. Appl. No. 09/108,646 dated Jan. 7, 2000, 5pp.
Notice of Allowance for U.S. Appl. No. 10/029,143 dated Sep. 25, 2003, 3pp.
Office Action for U.S. Appl. No. 10/029,143 dated Sep. 4, 2003, 2pp.
Office Action for U.S. Appl. No. 10/029,143 dated Mar. 28, 2003, 7pp.
Office Action for U.S. Appl. No. 09/164,473 dated Jul. 17, 2000, 9pp.
Notice of Allowability for U.S. Appl. No. 09/521,875 dated Sep. 17, 2002, 1pp.
Office Action for U.S. Appl. No. 09/521,875 dated Jun. 11, 2002, 2pp.
Office Action for U.S. Appl. No. 09/521,875 dated Dec. 21, 2001, 9pp.
Office Action for U.S. Appl. No. 09/521,875 dated Oct. 11, 2001, 2pp.
Office Action for U.S. Appl. No. 09/521,875 dated Jun. 20, 2001, 4pp.
International Search Report for Application No. WO 2004/005090 A3 dated Feb. 24, 2005, 2pp.
Written Opinion for Application No. PCT/US04/05090 dated Feb. 24, 2005, 3pp.
International Preliminary Report on Patentability for Application No. PCT/US04/05090 dated Apr. 6, 2005, 4pp.
Brewer, Kathleen Pearl, Cummings, Leslie E., "Gaming language: getting a handle on slots.", Cornell Hotel & Restaurant Administration Quarterly, Apr. 1995, Section: vol. 36, No. 2, p. 74, ISSN: 0010-8804, 7pp.
Rose, Bob, "New Ways for the House to Win", St. Louis Post-Dispatch, Oct. 3, 1996, Section: Get Out, p. 50, 2pp.
Brochure: "Power Play Slots", (http //www softsite com/ulti/), Jan. 1997.
Author Unknown; "Innovative Gaming Announces Nevada Approval of IGT Joint Venture Game-Bonus Streak", PR Newswire; May 14, 1997, Section: Financial News.
Poole, David, "Letter From Charlotte: Vegas Perfect for Racing", Las Vegas Review-Journal, Jun. 22, 1997, Section C, p. 2C.
"Shuffle Master Begins Immediate Rollout of Five Deck Frenzy and Introduces New Version of Let It Ride", PR Newswire, Jun. 30, 1997, Section: Financial News, 3pp.
Review: "Five Deck Frenzy", by Shuffle Master and IGT, (http //pitboss com/R-5deck shtm), download date: Feb. 1, 1998, 1pp.
Cook, Melissa, "The Best New Slots", Casino Player Magazine, Apr. 1998, p. 45.
Grochowski, John; "Royal Is Worth Taking A Risk" Chicago Sun Times, Apr. 5, 1998, Section: SHO, Casinos, p. 18; NC.
Green, Marian; "The New Slot Market", International Gaming & Wagering Business, May 1998, vol. 19, No. 5.
Website: "World of Slots—The Game King", Casino Journal, (http://www.casinocenter.com/journal/oct97/html/igt.html), download date Jun. 4, 1998.
Website: "A New Generation", Casino Journal (http://www.casinocenter.com/journal/oct97/html/bally html), download date Jun. 4, 1998.
Author Unknown; "The Interactive Experience", Casino Journal (http://www.casinocenter.com/journal/oct97/html/ac_coin.html), download date Jun. 4, 1998.
Brokopp, John, "New Slots Send Up Caution Flag", (http //brokopp casinocitytimes com/articles/545html), dated: Aug. 2, 1999.
Brochure: "Vision Series—5-Line Double Diamond Mine", IGT, Copyright 2000.
Website: "Double Diamond Mine Slots", (http //www igt com/GamingGroup/Games/gameasp?pid=5.12.108.119&theme_id=2390), download date: Feb. 9, 2004, 1pp.
Legato, Frank, "When a Bonus . . . Isn't", Strictly Slots, (http //www strictlyslots com/archive/0006ss/html/behind html), download date: Feb. 9, 2004.
Website: "Wild Wizard Slots", Gameport.com, (http //www gameport com/pcgames/cards/000075 html), download date: Feb. 9, 2004.
Website: "Williams X—Factor—3 Coin Dotmation" "AzSlot Machine Company—Used Slot Machines and Slot Machine Parts for Sale", (http //www slotdepot com/723 htm), download date: Feb. 9, 2004, 2pp.
Fey, A Pictorial History of Slot Machines, The First 100 Years, Liberty Belle Books, 1983, p. 89, 2pp.
Schneier, Applied Cryptography 2e, Chapter 2, 27pp.
The Game King, Casino Journal (http://www.casion center.com/journal/oct97/html/igt.html), Oct. 1997, 5 pp.
"Innovative Gaming Announces Nevada Approval of IGT Joint Venture Game—Bonus Streak", PR Newswire, May 14, 1997, 2 pp.
Author Unknown; "The Interactive Experience"; Casino Journal (http://www.casinocenter.com/journal/oct97/html/ac_coin.html), download date Jun. 4, 1998, 3 pp.
Website: "Gameport com: PC Games—Cards [Wild Wizard Slots]", (http //www gameport com/pcgames/cards/000075html), download date: Feb. 9, 2004, 2 pp.
Website: "IGT—Double Diamond Mine® Slots", (http www igt com/GamingGroup/Games/game asp?pid=5 12 108 119&theme_id=2390), download date: Feb. 9, 2004, 1 pg.
Patent Examiner's Answer to the Appeal Brief pertaining to Decision re U.S. Appl. No. 09/716,918, dated Nov. 28, 2008, 11 pages.
Decision on Appeal for U.S. Appl. No. 09/716,918, dated Jan. 5, 2011, 5 pages.

* cited by examiner

400

| | SYMBOL 410 | COUNT 412 |
|---|---|---|
| 420 | BELL | 12 |
| 430 | ORANGE | 29 |
| 440 | BAR | 2 |

FIG. 4A

450

| OCCURRENCE IDENTIFIER 452 | SYMBOL 454 | OCCURRENCE TIME/DATE 456 | EXPIRATION TIME/DATE 458 | STATUS 460 |
|---|---|---|---|---|
| 1 | BAR | 9/28/98 11:49 AM | 9/28/98 12:14 PM | EXPIRED |
| 2 | ORANGE | 9/28/98 11:51 AM | 9/28/98 12:11 PM | EXPIRED |
| 3 | BELL | 9/28/98 11:54 AM | 9/28/98 12:24 PM | EXPIRED |
| 4 | BELL | 9/28/98 11:59 AM | 9/28/98 12:29 PM | ACTIVE |
| 5 | ORANGE | 9/28/98 12:04 PM | 9/28/98 12:24 PM | EXPIRED |
| 6 | BAR | 9/28/98 12:06 PM | 9/28/98 12:31 PM | ACTIVE |
| 7 | ORANGE | 9/28/98 12:09 PM | 9/28/98 12:29 PM | ACTIVE |
| 8 | ORANGE | 9/28/98 12:09 PM | 9/28/98 12:29 PM | ACTIVE |
| 9 | ORANGE | 9/28/98 12:09 PM | 9/28/98 12:29 PM | ACTIVE |
| 10 | BELL | 9/28/98 12:13 PM | 9/28/98 12:43 PM | ACTIVE |

470 472

| CURRENT DATE/TIME 490 |
|---|
| 9/28/98 12:25 PM |

FIG. 4B

500

| | OUTCOME 502 | PAYOUTS | | |
|---|---|---|---|---|
| | | 1 COIN WAGERED 504 | 2 COINS WAGERED 506 | 3 COINS WAGERED 508 |
| 510 | NON-WINNING COMBINATION | 0 | 0 | 0 |
| 512 | CHERRY/ANY/ANY | 2 | 4 | 6 |
| 514 | ANY/ANY/CHERRY | 2 | 4 | 6 |
| 516 | CHERRY/CHERRY/ANY | 5 | 10 | 15 |
| 518 | ANY/CHERRY/CHERRY | 5 | 10 | 15 |
| 520 | CHERRY/ANY/CHERRY | 5 | 10 | 15 |
| 522 | CHERRY/CHERRY/CHERRY | 20 | 40 | 60 |
| 524 | BAR/ORANGE/ORANGE | 10 | 20 | 30 |
| 526 | ORANGE/ORANGE/BAR | 10 | 20 | 30 |
| 528 | ORANGE/ORANGE/ORANGE | 20 | 40 | 60 |
| 530 | BAR/PLUM/PLUM | 14 | 28 | 42 |
| 532 | PLUM/PLUM/BAR | 14 | 28 | 42 |
| 534 | PLUM/PLUM/PLUM | 20 | 40 | 60 |
| 536 | BAR/BELL/BELL | 18 | 36 | 54 |
| 538 | BELL/BELL/BAR | 18 | 36 | 54 |
| 540 | BELL/BELL/BELL | 20 | 40 | 60 |
| 542 | BAR/BAR/BAR | 50 | 100 | 150 |
| | 7/7/7 | 100 | 200 | 600 |

FIG. 5

PRIOR ART

600

616

| OUTCOME 602 | RANDOM NUMBER 604 | EXPECTED HITS PER CYCLE 606 |
|---|---|---|
| NONWINNING COMBINATION | 1-8570 | 8570 |
| CHERRY/ANY/ANY | 8571-9250 | 680 |
| ANY/ANY/CHERRY | 9251-9930 | 680 |
| CHERRY/CHERRY/ANY | 9931-10130 | 200 |
| ANY/CHERRY/CHERRY | 10131-10330 | 200 |
| CHERRY/ANY/CHERRY | 10331-10398 | 68 |
| CHERRY/CHERRY/CHERRY | 10399-10418 | 20 |
| BAR/ORANGE/ORANGE | 10419-10460 | 42 |
| ORANGE/ORANGE/BAR | 10461-10466 | 6 |
| ORANGE/ORANGE/ORANGE | 10467-10508 | 42 |
| BAR/PLUM/PLUM | 10509-10528 | 20 |
| PLUM/PLUM/BAR | 10529-10533 | 5 |
| PLUM/PLUM/PLUM | 10534-10583 | 50 |
| BAR/BELL/BELL | 10584-10587 | 4 |
| BELL/BELL/BAR | 10588-10607 | 20 |
| BELL/BELL/BELL | 10608-10627 | 20 |
| BAR/BAR/BAR | 10628-10647 | 20 |
| 7/7/7 | 10648 | 1 |

FIG. 6

PRIOR ART

700

| OUTCOME IDENTIFIER 702 | REEL 1 704 | REEL 2 706 | REEL 3 708 |
|---|---|---|---|
| 1 | BAR | BAR | PLUM |
| 2 | CHERRY | BAR | BAR |
| 3 | LEMON | ORANGE | ORANGE |
| 4 | BELL | ORANGE | BAR |
| 5 | BAR | 7 | 7 |
| 6 | BELL | ORANGE | LEMON |
| | | | |
| | | | |
| 45 | BAR | 7 | CHERRY |
| 46 | CHERRY | LEMON | 7 |
| 47 | PLUM | PLUM | ORANGE |
| 48 | 7 | BAR | PLUM |
| 49 | CHERRY | BELL | BAR |
| 50 | PLUM | BAR | 7 |

FIG. 7

800

| SYMBOL 810 | COUNT REQUIRED 812 | BONUS PAYOUT 814 |
|---|---|---|
| BELL | 100 | 300 |
| ORANGE | 75 | 250 |
| BAR | 50 | 200 |

830

FIG. 8

METHOD AND APPARATUS FOR ENHANCED PLAY OF A GAMING DEVICE

The present utility application is a continuation in part of utility application U.S. patent application Ser. No. 10/772,837 filed on Feb. 5, 2004 now abandoned which claims the benefit of priority of the following U.S. Provisional Patent Applications:

Ser. No. 60/447,265, filed on Feb. 13, 2003, and

Ser. No. 60/445,473 filed on Feb. 5, 2003.

Each of the above applications is incorporated herein by reference.

The present application is a continuation in part of co-pending utility application U.S. patent application Ser. No. 09/716,918, entitled "Electronic Amusement Device and Method for Enhanced Slot Machine Play", filed Nov. 20, 2000, which is a continuation of U.S. patent application Ser. No. 09/164,473, entitled "Electronic Amusement Device and Method for Enhancing Slot Machine Play", filed Oct. 1, 1998, and issued on Mar. 20, 2001 as U.S. Pat. No. 6,203,430.

Each of the above applications is incorporated herein by reference.

BACKGROUND

The present invention relates generally to gaming devices.

Modern casinos offer players a wide variety of game alternatives, including table games such as craps, blackjack and poker. Slot machines, however, constitute the major source of profits for casinos. Casinos therefore constantly strive to increase the attractiveness and playability of slot machines in ways that attract and retain players.

More particularly, it is of substantial value to a casino to encourage lengthier and faster play sessions at slot machines. When a player terminates play and walks away from a slot machine, that machine often goes unused for some period of time until a new player initiates play, thereby reducing revenue from that slot machine. Further, the speed with which an active player operates a machine has a direct bearing on the profit of a machine; the faster a slot machine is played, the greater the profit that machine will generate for its owner.

BRIEF DESCRIPTION OF THE DRAWINGS

FIG. 4A is a table illustrating a tracked symbol table;

FIG. 4B is a table illustrating an occurrence table;

FIG. 5 is a table illustrating a payout table;

FIG. 6 is a table illustrating a probability table;

FIG. 7 is a table illustrating an outcome table;

FIG. 8 is a table illustrating a tracked symbol reward table; and

DETAILED DESCRIPTION

Figure 1:
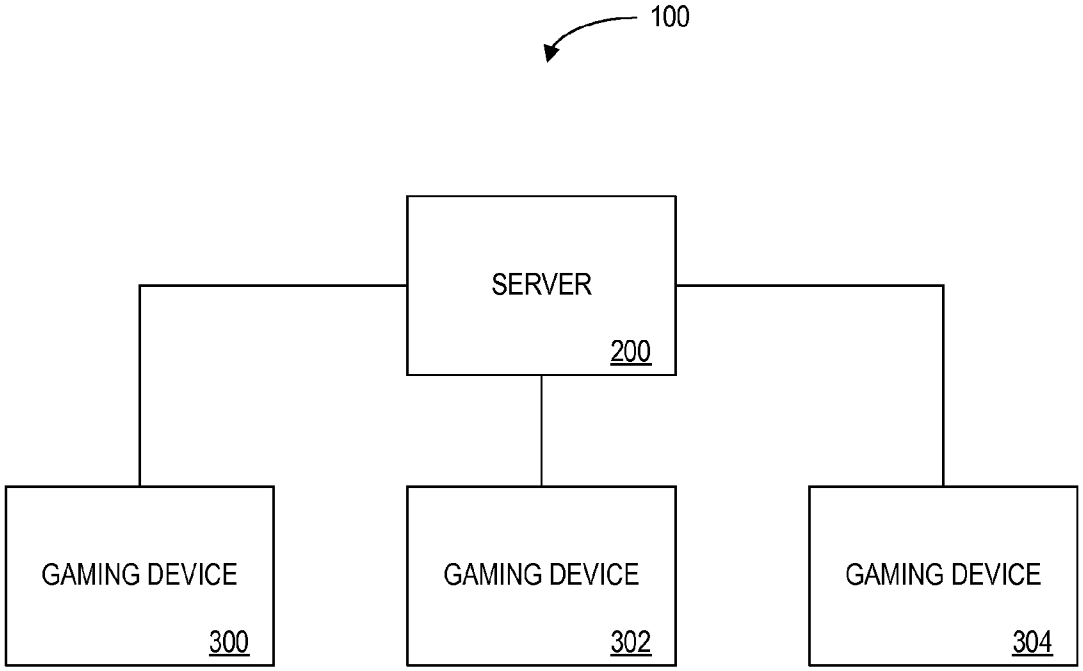
FIG. 1 is a block diagram illustrating a system for implementing an embodiment of the present invention.

Various embodiments of the present invention provide an improved method and apparatus for determining a bonus payout based on a running count of tracked symbol occurrences. For a casino operator, an advantage of various embodiments is to sustain the attention of slot machine players for a longer time, thereby increasing the average playing time for a slot machine. Another advantage, for a casino operator, of various embodiments is to encourage faster slot machine play by players using the device. An advantage, for a slot machine player, of various embodiments is to increases the excitement, anticipation and enjoyment of playing a slot machine.

According to an embodiment of the invention, an electronic amusement device and method is disclosed for directing a slot machine to process a bonus payout based on a running count of tracked symbol occurrences. The method includes the steps of identifying at least one tracked symbol and initializing a running count. The running count represents a number of occurrences of the tracked symbol, for example, during a particular time period or throughout a number plays of the slot machine.

The method may also include the steps of generating an outcome represented by a set of symbols, and determining an occurrence of any of the identified tracked symbols. The running count is adjusted accordingly, including increasing the running count to reflect occurrences of one of the tracked symbols and, in some embodiments, decreasing the running count to reflect expiration of occurrences of one of the tracked symbols. A bonus payout is determined based on the running count.

Slot machines, including conventional reel slot machines, video poker, video keno and video blackjack machines, are generally among the most profitable casino games. Casino operators can capture the interest of slot players by offering a bonus payout in addition to a traditional payout. By determining the bonus payout based on aggregated results of multiple plays during a gaming session, casino operators can encourage slot players to increase the average duration of their sessions. Further, because the bonus payout is based on multiple plays, such a bonus increases the anticipation, entertainment and excitement of a slot player.

In embodiments of the invention, a device (e.g. a slot machine, a server) determines whether a number of occurrences of a tracked symbol during a session of game play is sufficient to provide a bonus payout. The device maintains a running count of tracked symbols that have occurred and that are unexpired, during a gaming session. A bonus payout is determined based thereon (e.g. when the running count reaches or surpasses a predetermined amount).

In embodiments of the invention, a player begins a gaming session at a slot machine. During the session, the player plays a number of games, and generates an outcome for each game. Each outcome is represented by a set of symbols.

The slot machine identifies at least one tracked symbol, and throughout the session, the slot machine maintains a running count of the number of times the tracked symbol occurs in a generated outcome. In one embodiment, the running count may represent the number of times a specific symbol occurs in generated outcomes. In an alternate embodiment, the running count may represent the number of times any tracked symbol occurs in generated outcomes.

In some embodiments, although each occurrence of a tracked symbol causes the running count to be increased, an expiration condition is associated with each occurrence of a tracked symbol defining the condition under which the occurrence expires. Typically, an expiration condition is defined as a function of time or as a function of a number of plays. However, an expiration condition may alternatively be a function of a stored rule, and/or an event internal or external to game play, as discussed more fully herein. Upon the satisfaction of an expiration condition, the running count is decreased to reflect the expiration of an occurrence.

Embodiment will be further described with reference to a client-server architecture in which much of the processing is performed by the networked gaming device (client). Of course, one of ordinary skill in the art will readily recognize various alternate embodiments that are consistent with the spirit and scope of the present invention, including without limitation performing the processing steps at a slot server.

Apparatus Architecture

Figure 2:
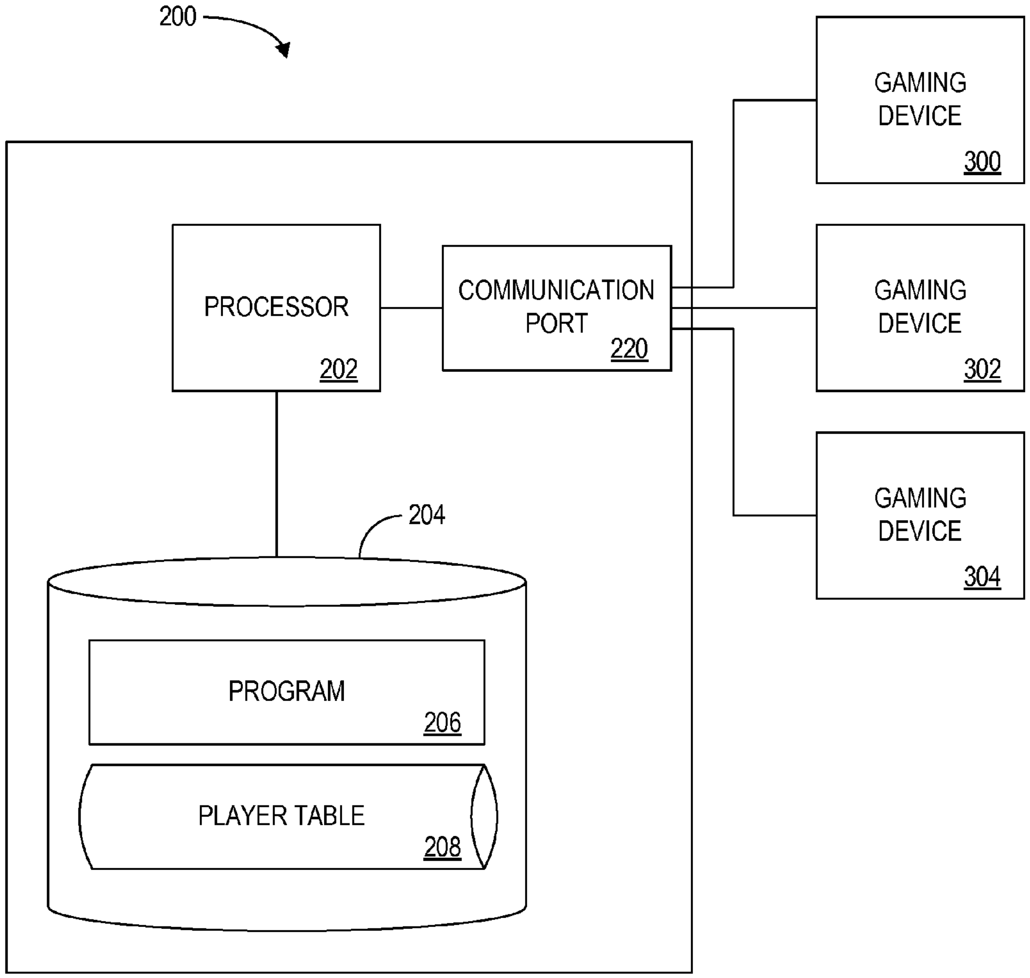
FIG. 2 is a block diagram of a slot server constructed in accordance with an embodiment of the present invention.
Figure 3A:
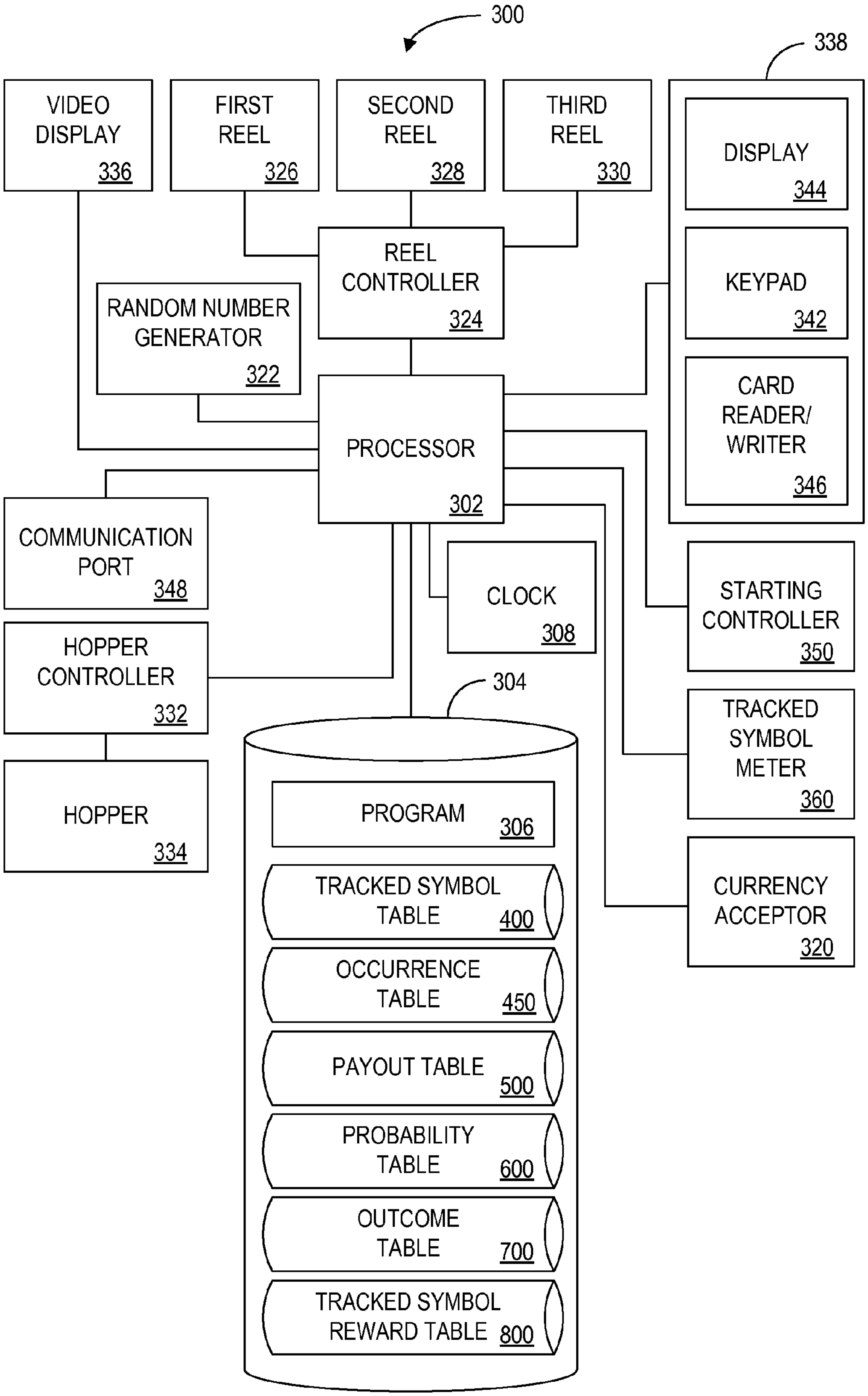
FIG. 3A is a block diagram of an electronic gaming device constructed in accordance with an embodiment of the present invention.
Figure 3B:
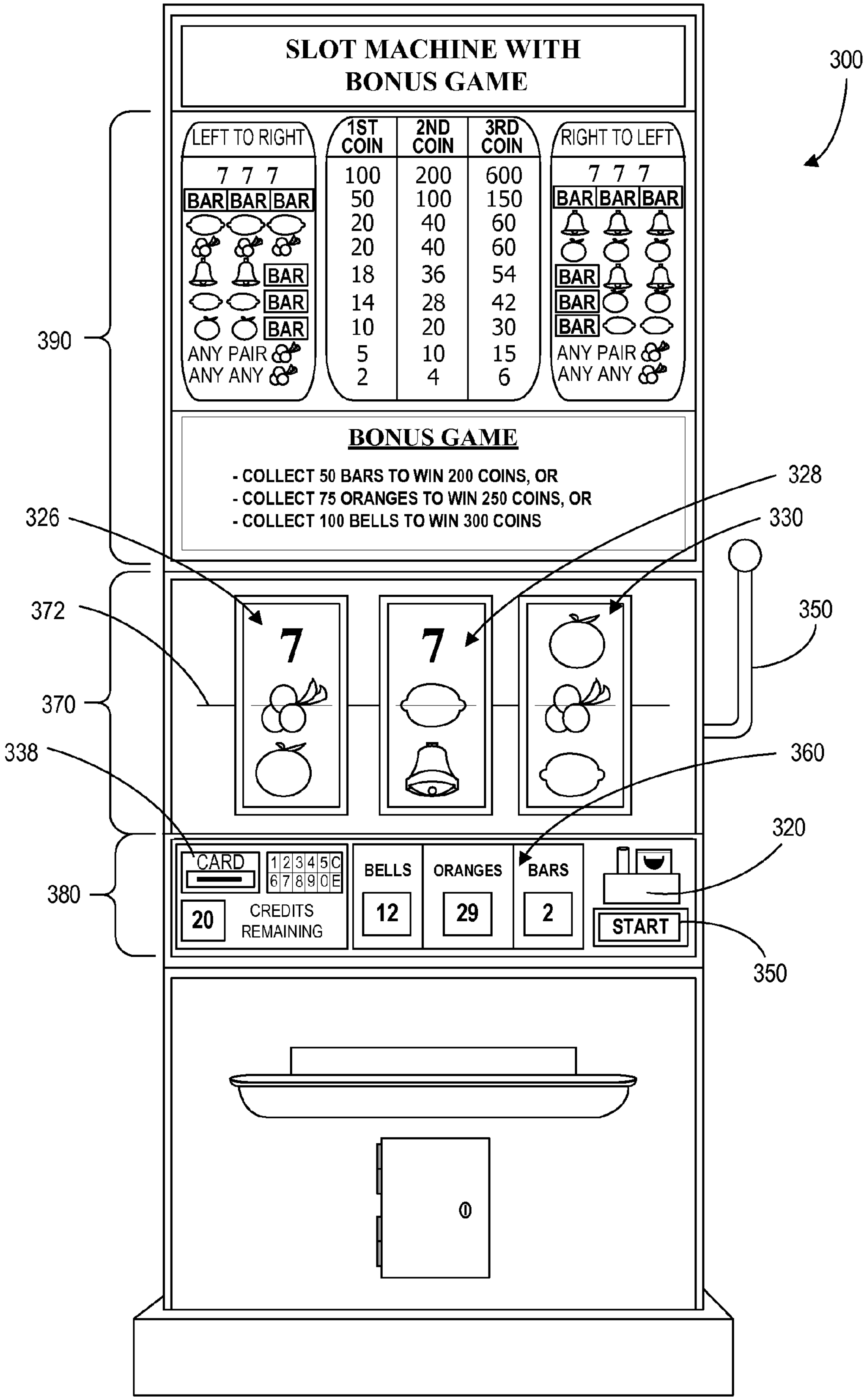
FIG. 3B is a plan view of the electronic gaming device of FIG. 3A.

FIGS. 1-3 generally illustrate the architecture of an apparatus according to an exemplary embodiment of the invention. FIG. 1 depicts a block diagram of a slot network 100. The network 100 includes a slot machine server 200 ("server") that is linked to and communicates with networked gaming devices or slot machines 300, 302 and 304. Although three gaming devices are shown, any number of networked gaming devices could be linked to and/or in communication with the server 200.

FIG. 2 illustrates the architecture of the server 200. Server 200 includes a processor 202, a storage device 204 and a communication port 220, as well as conventional server components well known in the art. A communication port 220 enables the server 200 to communicate with gaming devices 300, 302 and 304. Storage device 204 comprises an appropriate combination of magnetic and optical memory, such as disk drive memory, and semiconductor memory such as random access memory and read only memory. Storage device 204 contains program 206 and player table 208 for controlling server 200 in accordance with various embodiments of the present invention.

Various computer readable media may also store programs such as program 206. For example, a program may be stored in media such as compact discs, DVDs, and in electromagnetic transmissions (e.g. computer network transmissions).

FIG. 3A illustrates the architecture of slot machine 300. Slot machine 300, which may be substantially similar to slot machines 302 and 304, is controlled by processor 302 and communicates with slot server 200 via communication port 348. Processor 302 is connected to storage device 304, which stores program instructions and data for operating slot machine 300 in accordance with embodiments of the present invention. Storage device 304 can store tracked symbol table 400, occurrence table 450, payout table 500, probability table 600, outcome table 700 and tracked symbol reward table 800, described more fully with reference to FIGS. 4A-8, respectively. Storage device 304 further stores program 306 which preferably includes instructions for directing the processor 302, such as directing the processor to conduct a game of chance and instructions for implementing a method of determining the bonus payout. In addition, a gaming device (e.g. slot machine) may receive one or more programs (e.g. program 306) from a server (e.g. server 200), and run that program.

Further connected to processor 302 are a clock 308, a player card tracking device 338, a random number generator 322, a reel controller 324 for controlling reels 326, 328 and 330, a hopper controller 332 having an associated hopper 334, a currency acceptor 320, a video display 336 and a tracked symbol meter 360. It should be noted that video display 336 may display information which may serve as an adequate substitute for tracked symbol meter 360 as well as for reels 326, 328 and 330.

As illustrated, slot machine 300 comprises many conventional components. Some non-conventional components of slot machine 300 include the program instructions and data stored in storage device 304, as well as the tracked symbol meter 360. For purposes of better illustrating the embodiments, several conventional components, well known to those skilled in the art, are described only briefly. Although the present embodiment of the invention is described as implemented with physical components, the invention applies equally well to and includes software embodiments such as would be implemented on the Internet and other computer data networks.

Processor 302 may be embodied as one or more well known processing units, for example a Pentium class CPU manufactured by Intel Corp., or the like. Data storage device 304 comprises an appropriate combination of magnetic and optical memory, such as disk drive memory, and semiconductor memory such as random access memory and read only memory. In addition to the program instructions and data shown in FIG. 3, storage device 304 stores appropriate operating system and control software (not shown), functional to operate gaming device 300 in the manner described below. Random number generator 322 comprises one of many well known random or pseudo-random number generators suitable for use in a gaming device.

Currency acceptor 320 is operative to receive one or more coins or bills, and to transmit an appropriate value signal to processor 302. Hopper controller 332, and hopper 334 connected thereto, are operative under the control of processor 302 to dispense coins to a player. Starting controller 350 comprises a player-operated device such as a handle or button for initiating the play of a game.

Player card tracking device 338 comprises a player tracking interface including a card reader/writer 346 for receiving a player tracking card (not shown), a display 344 for communicating messages to the player, and a keypad 342 for receiving player input such as a player identifier.

3B depicts a front plan view of slot machine 300. For purposes of discussion, the slot machine 300 is generally illustrated as divided into three sections: a central panel 370, a lower panel 380, and an upper panel 390. Central panel 370 includes the display of first reel 326, second reel 328, and third reel 330. Each of these reels is configured to display the symbols printed on an associated reel strip. The reels may be mechanical in nature, or electronically represented with outputs shown on conventional electronic displays, such as a liquid crystal display ("LCD"). Central panel 370 includes a payline 372 that indicates the symbols of a resultant outcome. Central panel 370 further includes starting controller 350, in the form of a handle.

Lower panel 380 houses player tracking device 338. To the right of player tracking device 338 is tracked symbol meter 360 which indicates the number of tracked symbols which have been accumulated by the player. On the right portion of lower panel 380 is currency acceptor 320 and starting controller 350.

Upper panel 390 includes a display showing the contents of payout table 500 which describes all possible payouts for the slot machine, the details of which are discussed with respect to FIG. 5. The information is typically printed in bright colors and may be back-lit for easier viewing. Upper panel 390 also includes a display showing the requirements and payouts of the bonus game.

Data Tables

The tables illustrated below convey information regarding data which may be stored and/or processed in various embodiments of the invention. Those of ordinary skill in the art will readily understand that many other representations of the illustrated tables are possible, including more or less tables, and tables which allow for different data and different functionality. In addition, descriptions of when and how data is calculated or stored in tables would be readily understood as merely examples of several possible alternatives. In fact, different structures besides tables and the like may be employed, as would be well understood by those of ordinary skill in the art.

Referring now to FIG. 4A, there are illustrated three representative records of an exemplary tracked symbol table 400. As illustrated, each record of tracked symbol table 400 represents the progress of a player toward achieving a bonus associated with a tracked symbol. Each record of tracked symbol table 400 includes a symbol 410 and a count 412. Symbol field 410 identifies the tracked symbol associated with the record, and running count field 412 identifies the number of non-expired occurrences of the symbol generated during a session. Accordingly records 420, 430 and 440 of tracked symbol table 400 show that during the current session of play, a player has an active total of 12 bell symbols, 29 orange symbols and 2 bar symbols, respectively. The displayed running count for each tracked symbol is periodically adjusted to account for expired occurrences of tracked symbols.

Referring now to FIG. 4B, there are illustrated ten representative records of an exemplary occurrence table 450. Each record of occurrence table 450 represents a single occurrence of a tracked symbol generated during a session. Each record of occurrence table 450 includes occurrence identifier field 452 which uniquely identifies a record. Symbol field 454 identifies the tracked symbol associated with the record.

The time and date that the symbol was generated is stored in occurrence time/date field 456, and time at which the occurrence expires is stored in expiration time/date field 458. Although the expiration time/date is illustrated as an expiration condition, other expiration conditions are also possible, such as number of plays. As illustrated by the records of occurrence table 450, ORANGE symbols expire twenty minutes after occurring, BAR symbols expire twenty-five minutes after occurring and BELL symbols expire thirty minutes after occurring. Expiration conditions may be recorded in tabular format as illustrated by Table I, below, and stored in storage device 204 and/or storage device 304.

TABLE I

Expiration Condition Table

| Symbol | Expiration Period (minutes) |
|---|---|
| Orange | 20 |
| Bar | 25 |
| Bell | 30 |

Although the exemplary records reflect expiration periods that are based on the associated tracked symbol, in an alternate embodiment of the present invention, random expiration periods could be assigned for every occurrence.

Status field 460 represents the status of the occurrence represented by a record. Status field 460 can store an indication of "ACTIVE" or "EXPIRED." If status field 460 contains "ACTIVE," the occurrence is included in the running count for the associated symbol. If status field 460 contains "EXPIRED," the occurrence of the symbol is not included in the running count. Assuming that clock 308 generates the current date/time of 9/28/98 12:25 pm, as illustrated by reference numeral 490, records 470 and 472 illustrate the use of status field 460. As shown, the occurrence represented by record 470 expired at 12:24 pm, one minute prior to the current date/time. Accordingly, status field 460 of record 470 is set to "EXPIRED." Similarly, the occurrence represented by record 472 will expire at 12:29 pm, four minutes from the current date/time. Thus, status field 460 of record 472 is set to "ACTIVE."

Referring now to FIG. 5, there is depicted an exemplary conventional payout table 500. Each record of payout table 500 defines the payout awarded for each outcome, or family of outcomes, based on the number of coins wagered. Payout table 500 includes outcome field 502 representing the outcome or family of outcomes associated with a record. Payout table 500 also includes payout fields 504, 506 and 508 representing the payouts for wagers of one, two and three coins, respectively. For example, if a player wagers one coin on a play that results in an outcome of "BAR/ORANGE/ORANGE," slot machine 300 would provide a payout of ten coins, according to payout field 504 of record 522. If two coins were wagered on a play having the same outcome, slot machine 300 would provide a payout of twenty coins, according to payout field 506 of record 522.

FIG. 6 depicts a table representing the probability of specific outcomes generated by slot machine 300. Although no specific probability table is required, the selection of a probability table should be consistent with the requirements and payout amounts of the bonus game. Each record of probability table 600 represents an outcome or family of outcomes. Probability table 600 includes an outcome field 602 representing an outcome associated with a record. Probability table 600 further includes random number field 604 and expected hits per cycle field 606. Random number field 604 indicates a range of numbers which, when generated by random number generator 322, result in the associated outcome. For example, random numbers 10131-10330 correspond to outcomes for which the last two symbols are "CHERRY," as illustrated by record 616. Outcomes of "ANY/CHERRY/CHERRY" are expected to occur 200 times per cycle of 10,648 total plays in the cycle.

Referring now to FIG. 7, there is depicted outcome table 700 of slot machine 300. Each record of outcome table 300 represents an outcome generated by a play of slot machine 300. Although outcome table 700 may store every outcome from every session, in the illustrated embodiment, outcome table 700 stores the outcomes from every play of a current session. Outcome table 700 includes outcome identifier 702 that functions as a record identifier. Outcome table 700 also includes fields 704, 706 and 708 that represent the symbols from reel 1, reel 2 and reel 3, respectively, which together form the outcome.

Referring now to FIG. 8, there is depicted tracked symbol reward table 800 of slot machine 300. Each record of table 800 represents a bonus payout and the requirements for achieving the bonus payout. Table 800 includes symbol field 810 and count required field 812. Symbol field 810 and count required field 812 define the requirements for achieving a bonus payout associated with a record. Bonus payout field 814 defines the amount of the bonus payout awarded to a player who achieves the associated requirements.

Operation

Figure 9A:
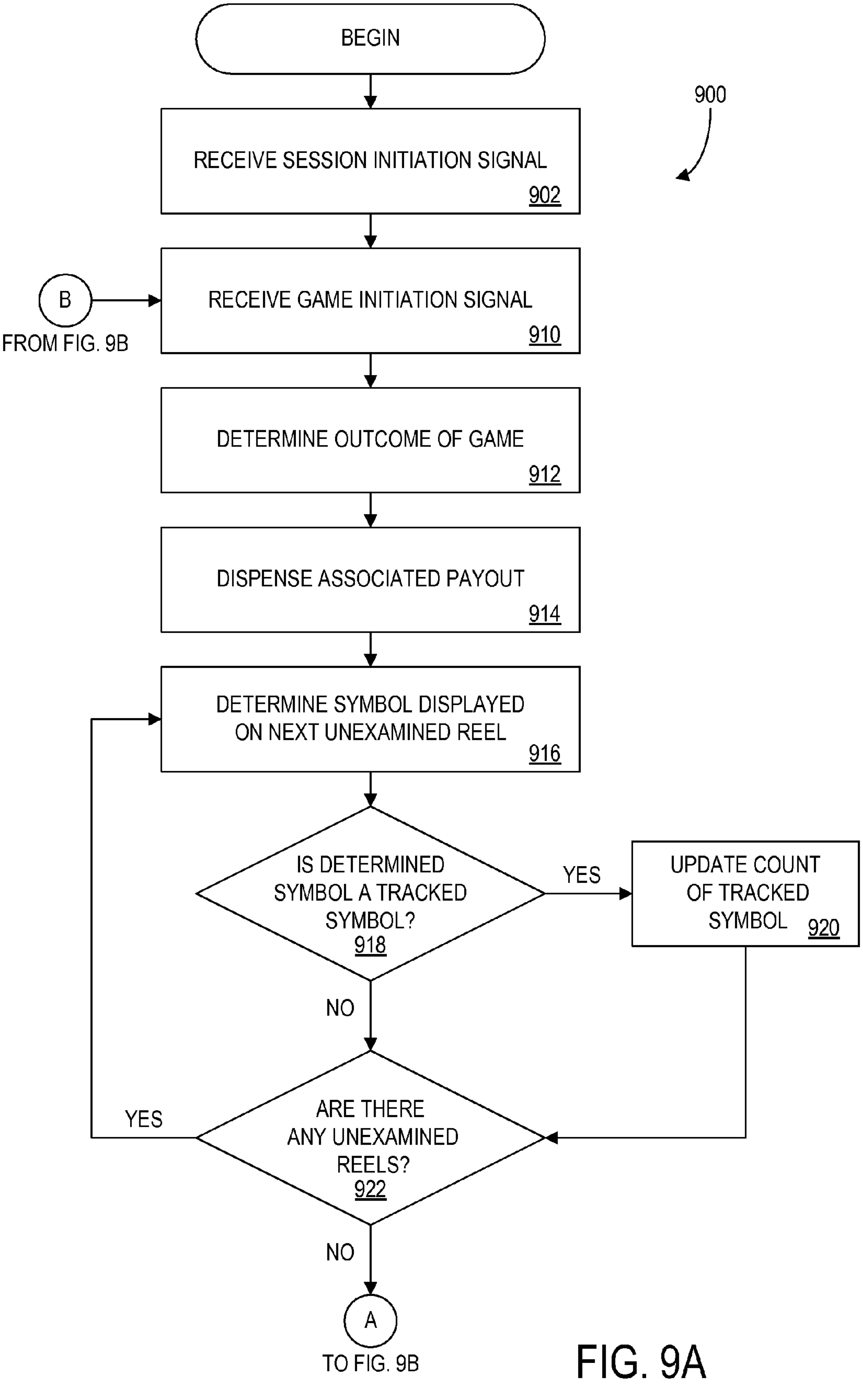
FIG. 9A-9B together comprise a flowchart illustrating a method for directing a slot machine to determine a bonus payout according to an embodiment of the present invention.
Figure 9B:
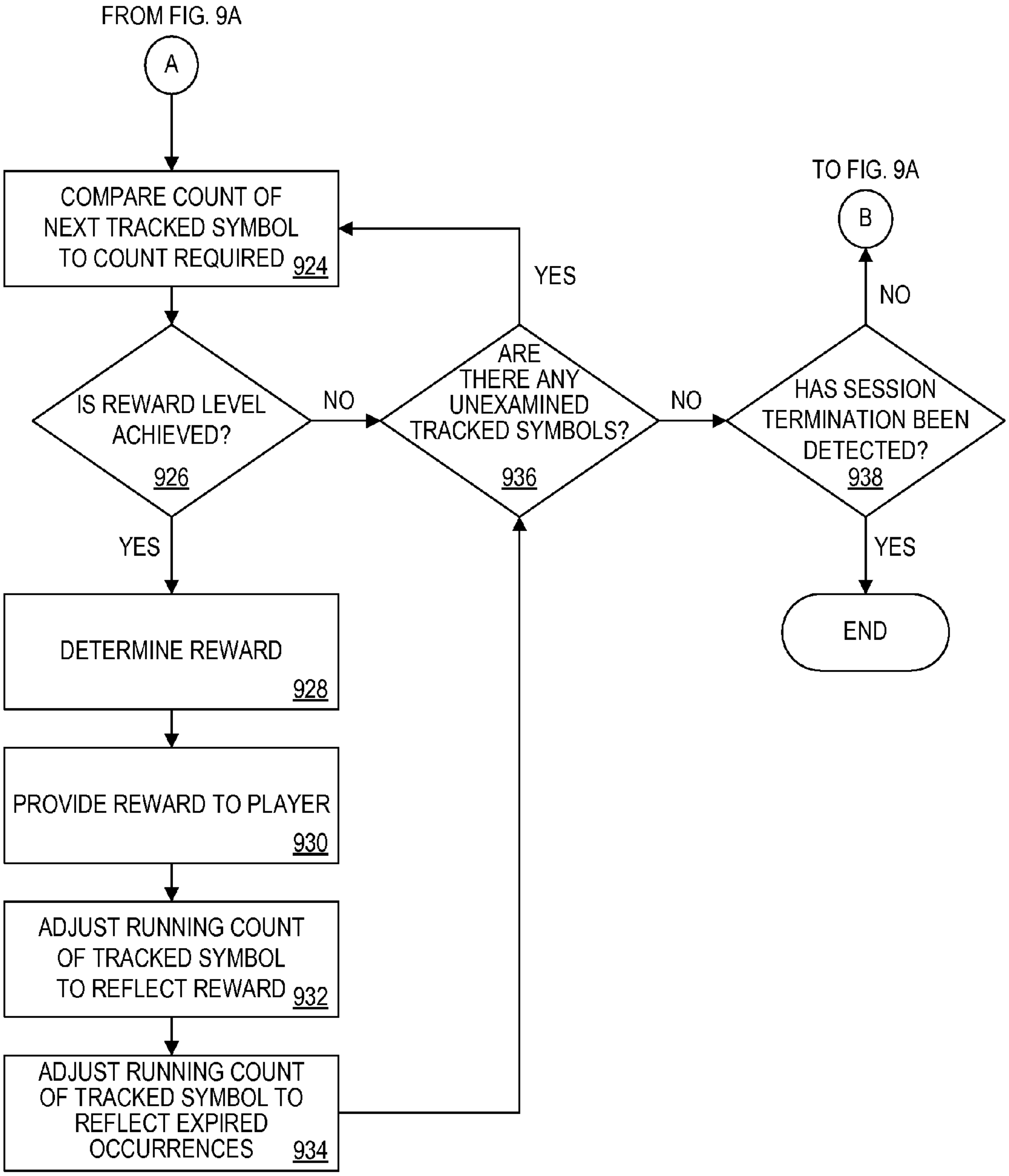

The operation of various embodiments of the apparatus will now be described in greater detail with reference to FIGS. 9A and 9B. Taken together, FIGS. 9A and 9B depict a flowchart of an exemplary process 900 employed by slot machine 300 to determine a bonus payout. The process steps may be implemented using the instructions of program 306.

The process begins with step 902 in which processor 302 receives a signal to initiate a session. Such a signal could be generated as a result of a player inserting a player tracking card. The session initiation signal could also be generated based on insertion of currency after an extended period during which the slot machine was not used. The session initiation signal represents the beginning of a new session.

The process continues with step 910 which directs processor 302 to receives a signal to initiate game play, such as by a pull of handle 350. At step 912, processor 302 determines an outcome for the game and provides the player a payout associated with the outcome, as shown by step 914. Steps 910-914 are game play steps which may be performed in conjunction with certain operating system and control software (not shown) to conduct the primary game offered by slot machine 300.

Steps 916 through 922 define a loop that causes each reel of the slot machine to be examined to determine whether the outcome includes any tracked symbols. At step 916, processor 302 determines which symbol is on the next reel that has not been examined. The first time through the loop, the first reel 326 is considered the next reel that has not been examined. Step 918 directs the flow of processing based on whether the determined symbol is a symbol which is tracked for the purpose of awarding a bonus payout. If the determined symbol is a tracked symbol, processor 302 is directed to update the running count of the tracked symbol. Otherwise, processor 302 determines whether all of the reels have been examined, and causes the process flow to loop back to step 916, accordingly.

Referring now to FIG. 9B, steps 924 through 936 define a logical loop that causes processor 302 to examine the running count of each tracked symbol to determine whether a reward level has been achieved. At step 924, the running count 412 of a tracked symbol is retrieved from tracked symbol table 400 and compared to the corresponding count required 812 of tracked symbol reward table. As illustrated by step 926, if a reward level has not been achieved, processor 302 is directed to proceed to step 936.

If a reward level has been achieved, processor 302 determines the reward at step 928 and provides the reward to the player at step 930. The reward is determined by retrieving the corresponding bonus payout 814 from tracked symbol reward table 800. The reward may be provided to the player in a number of ways, including dispensing coins, updating a credit meter, or crediting an account of the player based on identifying information stored on a player tracking card.

At step 932, processor 302 adjusts the running count of the tracked symbol to reflect the reward. In its simplest form, step 932 includes subtracting the count required to achieve the reward from the corresponding running count. Alternately, step 932 could include setting the running count to zero, or in an embodiment in which each occurrence is individually tracked, step 932 would include updating the table of occurrences 450. At step 934, processor 302 is directed to adjust the running count of the tracked symbol to reflect expired occurrences. At step 936, processor 302 is directed to continue examining tracked symbols until all tracked symbols have been examined.

At step 938, processor 302 determines whether the session has been terminated. If the session has not been terminated, process flow is directed back to step 910. Otherwise, the process concludes. The determination of whether a session has been terminated may be made in any number of ways, including detecting the removal of a player tracking card from player tracking device 338. Alternatively, slot machine 300 may determine that a session has been terminated after an extended period of inactivity.

Value of Tracked Symbols

Many embodiments of the present invention are possible. One series of embodiments addresses the valuation of tracked symbols for purposes of affecting a player's ability to qualify for a bonus payout. In embodiments where winning the bonus requires accumulation of a sum of values, different tracked symbols can be assigned different values. For example, the bonus payout may require accumulation of 50 points, where cherries are worth 1 point each, oranges are worth 2 points each, bells are worth 10 points each, and bars are worth 15 points each.

Alternatively, the bonus game may be presented on an accompanying visual display as an automobile or horse racing game, where different reel symbols affect a player's standing in the race. Reel symbols and the values they represent may dictate the distance traveled or speed attained by a player's car or horse (e.g. a bell symbol advances the player's car one tenth of the track length, while a bar symbol advances the player's car one seventh of the track length). Conversely, the reel symbols and the values they represent may negatively affect the player's standing in the race, for example by indicating gas consumption, a flat tire or a pit stop. Negative symbols could temporarily or permanently reduce or eliminate the player's ability to compete against (1) "virtual" cars or horses (operated automatically by server 200 or the gaming device) or (2) the cars or horses associated with players at other gaming devices. For example, the game may dictate that should a player receive a "7" symbol, a flat tire results, forcing the player's car to cease racing until either 15 seconds pass or until 2 more spins are initiated. This example illustrates that relatively greater payouts normally accompanying infrequent outcomes (e.g. "7's") can be offset by imposing a negative effect on the player's standing toward the bonus payout. Further, where the player's ability to re-enter the race is dependent on an increased rate of play, the casino benefits as players will likely spend more money at quicker rates.

Alternatively, where the game requires accumulation of a certain amount of points but only allows for accumulation of a single symbol-type (e.g. cherries), the symbol may be awarded differing point values depending on (1) point of time in the game session (e.g. lower points may be awarded later in the session), (2) the outcomes and payouts generated in the underlying game (e.g. lower points may be awarded if the player has received a certain number of winning outcomes during the game session), (3) the reel position in which the symbol was generated (e.g. if a cherry symbol is in the third reel, 10 extra points are awarded), (4) the occurrence of supplementary symbols in a given outcome (e.g. cherries accompanied by bars are awarded 10 extra points).

In yet another alternate embodiment, the value of accumulated tracked symbols may vary over time according to predetermined rules. Thus, in a game requiring accumulation of an apple symbol, an orange symbol, and a pear symbol, the value of the first two symbols accumulated may vary until a completing symbol is obtained, at which point a sum value can be determined and a payout awarded accordingly. For example, apple symbols may have values that at first increase by one value point every 5 seconds for the first 30 seconds after they are initially accumulated, and then decrease thereafter at a rate of one value point every 5 seconds until the value reaches zero, or until the game ends (whichever comes first). Orange symbols may have values that at first increase by five value points every 10 seconds for the first 60 seconds after they are initially accumulated, and then decrease thereafter at a rate of ten value points every 20 seconds until the value reaches zero, or until the game ends (whichever comes first). Pear symbols may have values that at first increase by ten value points every 5 seconds for the first 20 seconds after they are initially accumulated, and then decrease thereafter at a rate of five value points every 10 seconds until the value reaches zero, or until the game ends (whichever comes first). In this manner, every fruit symbol in the game "ripens" and "perishes" at different rates. Depending on the when the player completes the game by accumulating all of the required tracked symbols (in the above example, one apple, one orange, and one pear), the total value of the player's points are effected. Accordingly, players accumulating the symbols at different times during a game session will receive differing total point values, and may be awarded different bonuses.

Expiration of Tracked Symbols

According to various embodiments, each occurrence of a tracked symbol has an associated expiration criterion. As described, each accumulated tracked symbols expire after a predetermined time. An advantage of a time-based embodiment is that it encourages players to play quickly. Although fast players will tend to win more bonuses, they will also tend to spend more money playing the slot machine. Alternatively, accumulated tracked symbols may expire after a pre-determined number of plays. For example, after 100 plays, a bell symbol expires. In either event, the accumulation of tracked symbols allows players to feel that increased game play will result in a reward if such accumulation meets a predetermined level, while the expiration of tracked symbols serves to make attainment of the predetermined level more difficult, thereby allowing for larger payouts, increasing excitement, and encouraging additional game play. The accumulation and expiration of tracked symbols may be represented to the player visually, for example, by (1) images representative of the tracked symbols which visually "decay" or "perish" in accordance with expiration status, (2) images representative of tracked symbols which visually accumulate as part of a pyramid (or other structure) and gradually disappear or are removed to reflect expiration, or (3) images representative of the tracked symbols and corresponding images of clocks or other timers indicating the images' individual expiration statuses.

In an alternate embodiment, accumulated tracked symbols may have individual expiration rules so that such symbols expire at different rates. In another alternate embodiment, the expiration periods of each accumulated tracked symbol may be effected positively (i.e., prolonged) or negatively (i.e., shortened), in varying degrees, by certain events. For example, the outcomes and payouts associated with the underlying slot game may prolong or shorten expirations associated with accumulated symbols. Thus, the occurrence of any payout over $100 may cause an accelerated rate of expiration for any or all of the collected symbols. Or, the simultaneous occurrence of two "bar" symbols in any position on the pay line may prolong the expiration periods of certain accumulated symbols (e.g. by adding 10 minutes to the expiration dates of the first 5 symbols acquired in the gaming session).

Further, "opponents" that a player may face in a game may effect expiration periods positively or negatively. That is, the expiration periods of certain accumulated symbols may be prolonged or shortened based on the activities of other, competing players. In an embodiment where slot machines are connected via network, the outcomes of other games may effect the expiration periods associated with a player's session. For example, players in a neighboring bank of slot machines may compete for a single bonus prize, such as an automobile. Players may receive outcomes that shorten the expiration periods associated with symbols accumulated by other players, thereby increasing the player's standing in the game relative to the competing players. Similarly, a player's game may be effected by a "virtual" opponent, such as a game character controlled by server 200.

Alternatively, the expiration periods of certain symbols may be effected positively or negatively based on the occurrence or nonoccurrence of events external to the game. In such an embodiment, a real-time data link can be established between communication port 220 of server 200 and a remote server configured to provide data about the relevant external event. Example external event data that may effect the expiration periods of accumulated tracked symbols include (1) weather data, (2) financial (e.g. securities) data, and (3) data reflecting outcomes or payouts of other games. It should be noted that, in a similar manner, external event data may also effect the value of certain symbols, such as a point value.

In an alternative "front-loading" embodiment, there may be a relatively faster accumulation of symbols in the earlier portion of a game session and relatively slower accumulation of symbols in the later portion of the game session. In this embodiment, the aforementioned expiration function may or may not be desirable, as expiration in conjunction with front loading would significantly decrease the likelihood of the player winning a bonus. Front-loading configurations function to give players the impression that large jackpots are readily attainable, when in fact it becomes increasingly more difficult to attain. In other words, such a front-loading configuration would increase the anticipation and excitement of the game because the player would believe that he is on the verge of a bonus payout. In practice, casinos may wish to disclose the use of front-loading to players prior to the initiation of a game session so that they are not disappointed after game session has begun.

Accelerated accumulation earlier in the game can be achieved by configuring the game such that certain required symbols are more likely to occur than other required symbols. For example, in a game that requires the player to collect twenty oranges, twenty cherries and twenty bells, the player may sense more progress earlier in the game as the collection of more common symbols (cherries and oranges) occurs more frequently. However, as the game goes on, the player would realize that accumulation of the less common symbols (bells) requires a relatively prolonged session.

Alternatively, in a front-loading embodiment where there is one symbol that must be accumulated (e.g. the player must collect 50 oranges), the machine may be configured to provide those outcomes less frequently after a certain amount of time (e.g. after the first hour of play), or after a certain number of occurrences (e.g. after 25 oranges have been collected). Or, the odds of the symbol's occurrence in a game outcome may remain unchanged, but the rate at which the symbol is credited toward the bonus payout may decrease. For example, in such a game that requires accumulation of a single symbol type (e.g. an orange), the accumulation of the symbols can be visually communicated to the player via a digital representation of a pyramid that is assembled throughout the game session. If the player is required to collect 50 oranges in order to qualify for a bonus, collected oranges may fill the bottom portion of the pyramid earlier in the game session. Later in the game session, when outcomes resulting in oranges are less likely to lead to accumulation of oranges for bonus payout purposes, oranges that result from game play are less likely to stay on top of the pyramid. In other words, as the pyramid gets higher, game outcomes may result in oranges, but such oranges may "roll off" the sides of the pyramid and not be credited toward the achievement of a bonus payout. In this manner, the probability table of the underlying slot game need not be changed to accommodate front-loading in the bonus game.

Storage of Running Counts

Although embodiments were described in which running counts were stored locally at the slot machine, the running counts could be, e.g. associated with a player identifier from a player tracking card and stored by server 200. This would allow a player to "carry" the running counts from slot machine to slot machine. Occurrences of tracked symbols stored with the server might expire, e.g. after a number of hours or days. Such an embodiment also enables a player to end a playing session, save the running counts, and return to the same machine at a later time to resume the game using the stored running counts.

Alternatively, the running counts of accumulated tracked symbols could be stored on the player's tracking card. Such an embodiment would also allow a player to carry running counts from slot machine to slot machine. Any existing running counts would be stored on a player's tracking card at the end of a playing session. The running counts would be read off the card by the next slot machine into which the tracking card is inserted. That machine's running counts would be adjusted accordingly. This embodiment requires that the player card have data storage capability, such as that found in a smart card or writable magnetic strip.

Alternative Rewards

In addition to variations in the expiration of accumulated tracked symbols, variations in determining a bonus payout are also possible. Specifically, the determination of a bonus payout could be based on how many spins or how much time it took to achieve the reward level. For example, the bonus payout for accumulating 100 oranges may be 350 coins if they are accumulated within 30 spins, 325 coins if they are accumulated within 40 spins, and 300 coins if they are accumulated within 50 spins.

Alternatively, the reward provided to a player for attaining a particular reward level might be a payout multiplier instead of coins. For example, upon reaching 50 oranges, the player might earn a ten times multiplier for "ORANGE/ORANGE/ORANGE" enabled for the next 100 handle pulls. In yet another embodiment, slot club reward points could be awarded in place of currency.

Rewards could also be provided for expiring occurrences of tracked symbols. For example, every time a tracked symbol expires (i.e. is deducted from the running count), the player would be awarded a slot club reward point, a percentage of a slot club reward point or a cash-back reward (e.g. $0.01). The reward point or cash-back could then be used in the casino restaurants and/or shops. This extra reward would make the gaming experience more enjoyable by rewarding the player for events that would otherwise be considered "non-winning" events during slot play. The reward point or cash-back earned by the player would be tracked through the player's tracking card in a conventional manner.

As another alternative reward, players may be provided with the option of foregoing a bonus in exchange for credit in a new gaming session. For example, a player who has accumulated all necessary symbols and accordingly qualifies for a bonus from an initial game session may be offered the ability to apply half of their accumulated symbols to a new game session offering a larger, more valuable bonus if they agree to forego the bonus due from the initial game session. In another embodiment, players are simply awarded the initial bonus, and issued a credit toward the accumulation of bonus symbols in the next game session. Such an embodiment would encourage players to keep playing a game after the attainment of the initial bonus.

Group/Team Play

Although the described embodiment is directed toward individual play, it should be understood that an alternate embodiment of the present invention could support group play. Players could form teams, pooling their accumulated tracked symbols into running counts corresponding to the team. Once the once a reward level is achieved by the team, each team member would be provided a share of the associated bonus. A team may be formed interactively by allowing the player to actuate a "Team Play" button on the gaming device (not shown). Server 200 would link the player to at least one other player in response to the signal resulting from the actuated "Team Play" button.

Alternatively, players may form teams by registering at a kiosk or casino slot club center. In such an embodiment, the player identifiers of the team members would be stored in association with one another and a team identifier in a registration table. The registration table would be accessed when a team member inserts his tracking card into the card reader of a slot machine. The slot would read the player identifier from the player tracking card and transmit it to the server. The server would determine whether the player is registered on a team and, if so, would retrieve the team record in order to update any symbols accumulated by the player into the running counts of the team.

Rules Variations

A slot machine could also include program steps for alternate rules. Specifically, each tracked reel symbols could be associated with a particular reel. For example, on a three reel machine, only bars occurring on the first reel would be accumulated, only bells appearing on the second reel would be accumulated and only oranges appearing on the third reel would be accumulated. A tracked symbol meter could be disposed above each reel for visual association.

Other variations of the disclosed embodiment are also envisioned. Specifically, an alternative embodiment of the present invention could require that a tracked symbol only counts towards the running count if it is not part of a winning combination. Since players may be rewarded in various ways even when their outcome is not a winning one, it is not strictly necessary to reward players a second time for a winning outcome. For example, if bars, bells, and oranges are tracked symbols, and the player receives an outcome of CHERRY-CHERRY-ORANGE, he receives a payout of five coins for every coin wagered in accordance with a conventional payout schedule. Employing the alternate embodiment of the present invention, the player would receive the payout of five coins (if he only wagered one coin) and the orange that is part of that outcome would not be added to the running count of oranges.

Other variations in the rules are also possible. For example, the rules could be altered to adjust the running count only if the player has wagered the maximum amount allowable. Another variation of the rules may enable a player to receive credit for an occurrence of a tracked symbol, even if it is not part of an outcome. Specifically, symbols that are not on the payline but appear on the screen of the slot machine count towards the running count. For example, if an orange is just above or below the payline and oranges are tracked symbols, the running count for oranges would be adjusted.

Another variation of the rules includes cancellation of symbols. In this embodiment, one type of reel symbol may cancel another. In other words, one type of reel symbol may decrease the running count of another reel symbol. For example, a cherry may cancel an orange. Accordingly, if an orange is a tracked symbol, and the running count of oranges is twenty. A player receiving an outcome of CHERRY-7-7 would find his orange balance decreased by one to nineteen.

Yet another variation of the rules includes determining eligibility for bonus payouts based on the accumulation of at least two different tracked symbol occurrences. In such embodiments requiring accumulation of different or “complementary” tracked symbols, it may or may not be desirable to simultaneously employ the “expiration” functionality discussed herein. Examples and variations of “complementary symbol” embodiments are disclosed herein with reference to the “front loading” embodiments and the food preparation game format.

A further variation of the rules include modification of symbol values. In this embodiment, one type of reel symbol may modify the value associated with another reel symbol. In other words, one type of reel symbol may reduce or add to (e.g. multiply) the value of another symbol. For example, the occurrence of a “7” symbol may serve to reduce the value associated with a cherry symbol such that the accumulated cherry symbol expires in half the time that it otherwise would.

Another variation of the rules includes time periods (hereafter, “holding periods”) for which play must continue after accumulation of tracked symbols. In other words, the rules may require that a player not only accumulate certain required symbols, but also “hold” the symbols for a certain period of time by continuing play at the slot machine. In such an embodiment requiring holding periods for tracked symbols, it may or may not be desirable to simultaneously employ the “expiration” functionality discussed herein. An example of a holding period rule is discussed herein with reference to the food preparation game format.

Yet another variation of the rules includes providing a bonus payout for achieving a certain combination of tracked symbols. For example, a bonus payout of fifty coins could be awarded if each of the running counts is equal to ten simultaneously. In another example, a bonus payout of fifty coins could be awarded if a specific running count exactly matched a required count. The particular number that the running counts would have to equal could be determined by the casino or selected by the player using the keypad 342.

Still another variation of the rules includes displaying special offers to the player upon achieving a predetermined reward level. Such offers could include a free night’s stay at the casino hotel, a ticket to a show or other casino event or a free dinner at the casino restaurant. The offers could be determined by the server and be based on revenue-management rules in order to optimize the revenue of the casino. For example, a show starting in a couple of hours may have a large number of empty seats which the casino would rather give away than have them remain empty. The server may determine these offers by checking databases of reservations for the casino hotel or show. The offers may be made upon achieving the predetermined reward level (e.g. “Collect 50 Plums to Win a Free Room!”) in place of the monetary award. Alternately, the reward offers could be made when the player is close to achieving the sought after balance (e.g. has 48 plums accumulated). Depending on the reward, it may be more cost effective for the casino to make the offer rather than pay a monetary reward to the player if he does get to the sought after level. If the player accepts the offer, his balance would be reset to zero.

Video Poker Embodiment

Many of the disclosed embodiments may be applied to games such as video poker. As in the slot machine embodiments, in a video poker embodiment, a player achieves a running count to earn a reward. The running count is preferably a count of occurrences of types of cards. A type of card may be a specific card value (e.g., aces, twos and threes), a set of card values (e.g., face cards) or a particular suit (e.g., hearts, diamonds, spades and clubs).

In the case where the tracked card types are suits, an exemplary video poker tracked symbol reward table is illustrated as Table II below. Of course, the expiring nature of the card types would apply in the same ways as described with respect to the slot machine embodiments.

TABLE II

Video Poker Tracked Symbol Reward Table

| Suit | Count Required | Bonus Payout |
|---|---|---|
| Hearts | 100 | 200 |
| Clubs | 150 | 250 |

In another embodiment, a running count may be adjusted based on the numeric card values (e.g., face cards are valued at ten, aces are valued at eleven). Regardless of what a running count represents, there are many variations regarding how to adjust the running count in a video poker embodiment. Specifically, there are several ways to determine whether an occurrence of a card type has been generated.

For example, all cards displayed during a game (including discarded cards) could be examined to determine whether a card type occurrence has been generated. In other words, every card displayed during a game is considered in the decision to adjust the running count. In an alternate embodiment, the cards examined to determine whether a card type occurrence has been generated may be limited to only the cards of the final outcome. In such an embodiment, only the cards comprising the final hand are considered in the decision to adjust the running count. In yet another embodiment, only certain card positions may be examined to determine whether an occurrence of a card type has been generated. For example, only the cards displayed in the first card position might be considered in the decision to adjust the running count. Of course, other ways to determine occurrences of tracked symbols in a video poker embodiment are also possible, such as by examining only discarded cards.

Food Preparation Game Format

A game format having a food preparation theme is also contemplated. In such a game, players are required to accumulate at least two different or complementary tracked symbols, which may represent different “ingredients” in a “recipe.” In one embodiment, mere accumulation of the at least two different or complementary tracked symbols qualifies players for a bonus payout. In another embodiment, different recipes (i.e. different combinations of complementary tracked symbols) may yield different bonus payouts. In such an embodiment, a player may accumulate all tracked symbols required for a first recipe that yields a first bonus payout, but may choose to forego the first bonus payout for a chance to win a second, greater bonus payout that requires further accumulation of additional symbols.

For example, a slot machine featuring a “bake the cake” game format may require players to accumulate (1) two egg symbols, (2) one flour symbol, (3) two milk symbols and (4) one chocolate symbol. These symbols may be represented on the reels of the slot machine. Players accumulating all of these necessary ingredients are deemed to have completed the recipe for a chocolate cake, and would therefore qualify for a bonus payout. Alternatively, players collecting most of the required ingredients could win a somewhat smaller award. In yet another embodiment, players accumulating all necessary ingredients required for a bonus payout may be offered the option to forego the earned bonus payout, and "press their luck" by continuing the game session with hopes of accumulating additional ingredients necessary for completion of a different recipe, which may yield an enhanced bonus payout. For example, in order to qualify for a greater bonus payout, a player may be required to accumulate all of the above ingredients, and also fifty cherry symbols.

Further, alternative mechanisms are contemplated for dealing with accumulation of more ingredients than are necessary for a given recipe. According to one embodiment, if a player has accumulated enough of a given ingredient for a given recipe, any remaining ingredients of that type may be eliminated as reel symbols on the graphical reels of the slot machine. The game device may replace the ingredient symbol(s) with another reel symbol, or may simply eliminate the ingredient's reel symbol position and thereby reduce the number of possible reel stops associated with that reel by one. According to another embodiment, duplicative ingredients may be accumulated and applied toward different bonus prizes (e.g. different recipes or different productions of the same recipe).

In such a food preparation game, the rules may be configured to allow for certain "substitute" ingredients. In such an embodiment, different reels symbols may be accorded the same status for purposes of the food preparation game so that, for example, "bar" symbols are treated the same as "egg" symbols.

Additionally, a holding period rule may be employed to require players to hold the accumulated ingredients for a threshold amount of time in order to qualify for a bonus payout. For example, in a "bake the cake" game, in order to qualify for a bonus payout, players may be required to (1) collect (a) two egg symbols, (b) one flour symbol, (c) two milk symbols and (d) one chocolate symbol; and (2) thereafter continue playing for at least twenty minutes (i.e. while the cake "bakes"). Such a holding period rule would function to further encourage prolonged game play.

It should be noted that, in an alternate embodiment, a player may qualify for a bonus payout by promising to satisfy the "holding period" requirement in the future. In other words, in such an embodiment, the player could instantly receive the bonus payout upon collecting all the requisite ingredients and indicating a promise to play for the required time at some point in the future. The bonus payout could be rescinded by the casino if the player subsequently failed to perform by playing for the required amount of time. For example, the bonus payout could be rescinded by instituting a charge to the player's credit or debit card in an amount equal to the bonus payout.

It should also be noted that, in yet another alternate embodiment, a game having a food preparation theme may incorporate a "baking" or "time" component by providing for a clock symbol (or other symbolic representation of a time element) on the reels of the slot machine. In such an embodiment, a player may instantly satisfy the baking time requirement by receiving an outcome having one or more such reel symbols. In a further embodiment, one or more reel stop positions may contain an amount of time. For example, one reel symbol might represent 30 seconds of cooking time while another reel symbol represents 45 seconds of cooking time. Players could be required to "collect" 10 minutes of baking time in addition to collecting all of the necessary ingredients in order to qualify for the bonus.

Additional Bonus Game Formats

Many of the disclosed variations of the invention may be applied to enable many other bonus game formats. For example, in a Bingo game format players must collect certain pieces of a game board in order to win. In such a Bingo embodiment, collected board positions may expire as discussed above, making it more difficult for players to win the Bingo bonus game. Similarly, Scrabble® and Wheel of Fortune® game formats are contemplated, in which players must assemble words from letters generated by game outcomes. In such an embodiment, collected letters may expire as discussed above, making it more difficult for players to complete words and thereby score points in the bonus game.

Likewise, a video game format is contemplated in which the object is to break through a representation of a wall, such as the wall to a bank's vault. Certain game outcomes could result in destruction of the wall, and expiration as discussed previously could be represented as the rebuilding of the wall.

Further, an "egg timer" game format is contemplated in which players must accumulate visual representations of eggs and continue playing until they are "cooked" such that each cooked egg is potentially awarded with a bonus. In such an "egg timer" game, the prospect of winning a bonus would encourage players to prolong play until eggs are cooked. It should be noted that such an "egg timer" game in essence serves to achieve the same purpose as the above-described "expiration" concept, to with encouraging players to play for longer periods of time, but does so by presenting the time-based requirement as an "affirmative" prerequisite to bonus eligibility (i.e., the eggs must cook for a predetermined amount of time) rather than as a "negative" prerequisite to bonus eligibility (i.e. a threshold number of accumulated symbols must not expire).

While the best mode for carrying out the invention has been described in detail, those familiar with the art to which the invention relates will recognize various alternative designs and embodiments for practicing the invention. These alternative embodiments are within the scope of the present invention. Accordingly, the scope of the present invention embodies the scope of the claims appended hereto.

We claim:

1. A method comprising:

receiving, at a device operable to facilitate a wagering game, a player identifier;

receiving, from a server, a running count which is based on the player identifier;

generating, by the device, a plurality of outcomes, in which each outcome includes a plurality of instances selected from a set of slot machine symbols, and the set of slot machine symbols includes a plurality of predetermined slot machine symbols, and the plurality of predetermined symbols includes at least a first predetermined symbol and a second predetermined symbol;

adjusting, by the device, the running count based on occurrences of the predetermined slot machine symbols in each outcome;

adjusting, by the device, the running count based on occurrences of the predetermined symbols that have expired; and determining, by the device, a bonus payout based on the running count if the running count indicates an occurrence of the first predetermined symbol and an occurrence of the second predetermined symbol.

2. The method of claim 1, in which adjusting the running count based on occurrences of the predetermined symbols that have expired comprises:

determining whether an occurrence of the predetermined symbols has expired based on a number of plays after which the occurrence expires.

3. The method of claim 1, in which adjusting the running count based on occurrences of the predetermined symbols that have expired comprises:

determining whether an occurrence of the predetermined symbols has expired based on a time after which the occurrence expires.

4. The method of claim 1, further comprising:

providing an offer to obtain a first bonus payout amount based on the running count.

5. A method comprising:

receiving a game program from a server, and running the game program, which directs a device to perform a method which includes:

receiving, by a device operable to facilitate a wagering game, a player identifier;

receiving, by the device and from the server, a running count which is based on the player identifier;

generating, by the device, a plurality of outcomes, in which each outcome includes a plurality of instances selected from a set of slot machine symbols, and the set of slot machine symbols includes a plurality of predetermined slot machine symbols, and the plurality of predetermined symbols includes at least a first predetermined symbol and a second predetermined symbol;

adjusting, by the device, the running count based on occurrences of the predetermined slot machine symbols in each outcome;

adjusting, by the device, the running count based on occurrences of the predetermined symbols that have expired; and determining, by the device, a bonus payout based on the running count if the running count indicates an occurrence of the first predetermined symbol and an occurrence of the second predetermined symbol.

6. An apparatus comprising:

a processor, and a storage device in communication with the processor, in which the storage device stores a program that is operable to direct the processor to perform the method of claim 1.

* * * * *

UNITED STATES PATENT AND TRADEMARK OFFICE

CERTIFICATE OF CORRECTION

PATENT NO. : 8,016,658 B2
APPLICATION NO. : 12/030522
DATED : September 13, 2011
INVENTOR(S) : Jay S. Walker et al.

It is certified that error appears in the above-identified patent and that said Letters Patent is hereby corrected as shown below:

Title Page, Item (12) Replace "Wakker, et al." with "Walker et al."

Title page, Item (75) Replace first inventor, "Wakker; Jay S." with "Walker; Jay S."

Signed and Sealed this
Twentieth Day of December, 2011

David J. Kappos
*Director of the United States Patent and Trademark Office*